US011208057B2

(12) United States Patent
Su

(10) Patent No.: US 11,208,057 B2
(45) Date of Patent: Dec. 28, 2021

(54) RV SEWER HOSE SUPPORT WITH ADJUSTABLE SUPPORTING HEIGHT

(71) Applicant: Peng Su, Zhejiang (CN)

(72) Inventor: Peng Su, Zhejiang (CN)

(73) Assignee: Hangzhou Sweet I&E Co., Ltd., Zhejiang (CN)

( * ) Notice: Subject to any disclaimer, the term of this patent is extended or adjusted under 35 U.S.C. 154(b) by 0 days.

(21) Appl. No.: 16/851,103

(22) Filed: Apr. 17, 2020

(65) Prior Publication Data

US 2021/0300268 A1  Sep. 30, 2021

(30) Foreign Application Priority Data

Mar. 25, 2020  (CN) .......................... 202010216958.X

(51) Int. Cl.
*B60R 15/00* (2006.01)
*F16L 3/02* (2006.01)

(52) U.S. Cl.
CPC ................ *B60R 15/00* (2013.01); *F16L 3/02* (2013.01)

(58) Field of Classification Search
CPC ......... B60R 15/00; B60R 15/04; E03C 1/021; E03F 1/008; F16L 3/1226; F16L 3/10; F16L 3/00; F16L 3/01; F16L 3/015; F16L 3/003; F16L 1/0243; F16L 1/0246; F16L 1/024; F16L 3/02; B05B 15/625
See application file for complete search history.

(56) References Cited

U.S. PATENT DOCUMENTS

| | | | | |
|---|---|---|---|---|
| 2,846,168 | A * | 8/1958 | Schroeter | A01G 25/00 248/49 |
| 3,021,102 | A * | 2/1962 | Kuempel | E04D 13/08 248/49 |
| 4,722,500 | A * | 2/1988 | Bray | F16L 3/00 138/106 |
| D415,409 | S * | 10/1999 | Pyevach, Sr. | D8/380 |
| 6,619,596 | B1 * | 9/2003 | Caine | B60R 15/00 138/106 |
| 7,425,028 | B1 * | 9/2008 | Angel | B60R 11/00 16/422 |
| 7,434,771 | B1 * | 10/2008 | Tai | F16L 3/00 138/106 |
| 7,926,768 | B2 * | 4/2011 | Prest | E03F 1/008 248/80 |

(Continued)

*Primary Examiner* — Christopher Garft

(57) ABSTRACT

The invention discloses a RV sewer hose support with adjustable supporting height, comprising supporting components; adjacent supporting components are rotatably connected; the component comprises a supporting plate and a supporting horizontal rod; supporting vertical rods are symmetrically arranged above the plate, and the vertical rod has connecting holes; one side of the horizontal rod is symmetrically provided with a supporting post; supporting legs are symmetrically provided below the plate; a clamping groove is provided on the opposite outer side of the vertical rod away from the plate. The invention use only two sets of molds to realize the production of the main parts, which not only saves costs, but also facilitates adjusting the supporting height according to the actual situation; it avoids wasting molds and raw materials due to the need of different heights in actual use, and has a stable support, beautiful appearance and long service life.

5 Claims, 5 Drawing Sheets

(56) References Cited

U.S. PATENT DOCUMENTS

| | | | | |
|---|---|---|---|---|
| 9,365,168 B2 * | 6/2016 | Boutin | ................... | B60R 15/04 |
| 9,631,355 B1 * | 4/2017 | Taraszkiewicz | ........ | E03F 1/008 |
| 2007/0210215 A1 * | 9/2007 | Prest | ...................... | B60R 15/00 |
| | | | | 248/80 |
| 2016/0018022 A1 * | 1/2016 | Boutin | ................... | E03F 1/008 |
| | | | | 248/75 |

* cited by examiner

RV SEWER HOSE SUPPORT WITH ADJUSTABLE SUPPORTING HEIGHT

BACKGROUND OF THE INVENTION

1. Field of the Invention

The invention relates to the technical field of RV auxiliary accessories, in particular to a RV sewer hose support with adjustable supporting height.

2. Description of the Related Art

The recreational vehicle (RV), also known as the motor home, can be parked freely on beaches, lake shores, grasslands, hillsides, and forests far away from the city, and at the same time has the function of city lifestyle: making delicious food yourself, taking a hot bath, sleeping on a soft and comfortable bed, watching TV, listening to music, playing DVDs, etc., so it is becoming more and more popular. The RV needs to discharge sewage and drain it to the designated position through the sewer hose during use, and the RV sewer hose support can support and fix the RV sewer hose. However, the prior mainstream RV sewer hose supports mostly have a fixed supporting height, the height and the descending range of the supporting hose cannot be adjusted, and multiple sets (8 sets of molds for most of the products) are required to produce a complete set of workable products; at the same time, too many molds will reduce the production efficiency, and when the product is assembled, it is necessary to arrange a plurality of plastic sheets of the bracket main body of different heights in order to assemble them into a complete product.

SUMMARY OF THE INVENTION

The objective of the invention is to solve the deficiencies in the prior art, and to provide a RV sewer hose support with adjustable supporting height.

In order to solve the technical issues above, the invention provides a RV sewer hose support with adjustable supporting height, comprising a plurality of supporting components, wherein the adjacent supporting components are rotatably connected; the supporting component comprises a supporting plate and a supporting horizontal rod; supporting vertical rods are symmetrically arranged above the supporting plate along the middle to both sides, and the supporting vertical rod is provided with a plurality of connecting holes along the extending direction; one side of the supporting horizontal rod is symmetrically provided with a supporting post that is matched with the connection holes along the middle to both sides; the supporting plate and the supporting vertical rod are integrally formed, and the supporting plate has a narrow upper and wide lower structure; the opposite outer side where the supporting vertical rod meets the supporting plate is in an arc shape, and the upper part of the supporting plate located between two supporting vertical rods is concave in a "V" shape; supporting legs are symmetrically provided below the supporting plate along the middle to both sides; the supporting leg is integrally formed with the supporting plate, and the lower part of the supporting plate located between two supporting legs is concave in a "V" shape; a clamping groove is provided on the opposite outer side of the supporting vertical rod away from the supporting plate.

As an improvement, the supporting plate is provided with perforations evenly; reinforcement ribs are provided on the edge of the perforation, the edge of the supporting plate, the edge of the supporting leg, the edge and interior of the supporting vertical rod and the edge of the supporting horizontal rod.

As an improvement, the supporting post is provided with a slot in the middle to facilitate the clamping and disassembly of the supporting post and the connecting holes.

As an improvement, the main body of the supporting horizontal rod is a concave design, which can reduce the shrinkage deformation due to the thick workpiece while reducing the weight of the supporting horizontal rod.

As an improvement, the supporting plate is provided with a first connecting base and a second connecting base at both ends, and both the first connecting base and the second connecting base are provided with shaft holes; rotary connection is achieved between adjacent supporting plates through the first connecting base on one supporting plate, the second connecting base on the other supporting plate, and a pin shaft.

The advantages of the invention over the prior art are: the invention adopts a method of adjusting the supporting position, and can use only two sets of molds to realize the production of the main parts of the entire set of products, which not only saves the production and R&D costs, but also facilitates the user to adjust the supporting height of the sewer hose support according to the actual situation; it avoids wasting molds and raw materials due to the need for the design of main bodies of different heights in actual use, and has a stable support, beautiful appearance and long service life.

As shown in the figures: 1 refers to the supporting plate; 2 refers to the supporting horizontal rod; 3 refers to the supporting vertical rod; 4 refers to the connecting hole; 5 refers to the supporting post; 6 refers to the supporting leg; 7 refers to the clamping groove; 8 refers to the perforation; 9 refers to the reinforcement rib; 10 refers to the first connecting base; 11 refers to the second connecting base.

DETAILED DESCRIPTION OF THE PREFERRED EMBODIMENTS

The RV sewer hose support with adjustable supporting height of the invention is further described in detail hereinafter with reference to the drawings.

Figure 1:
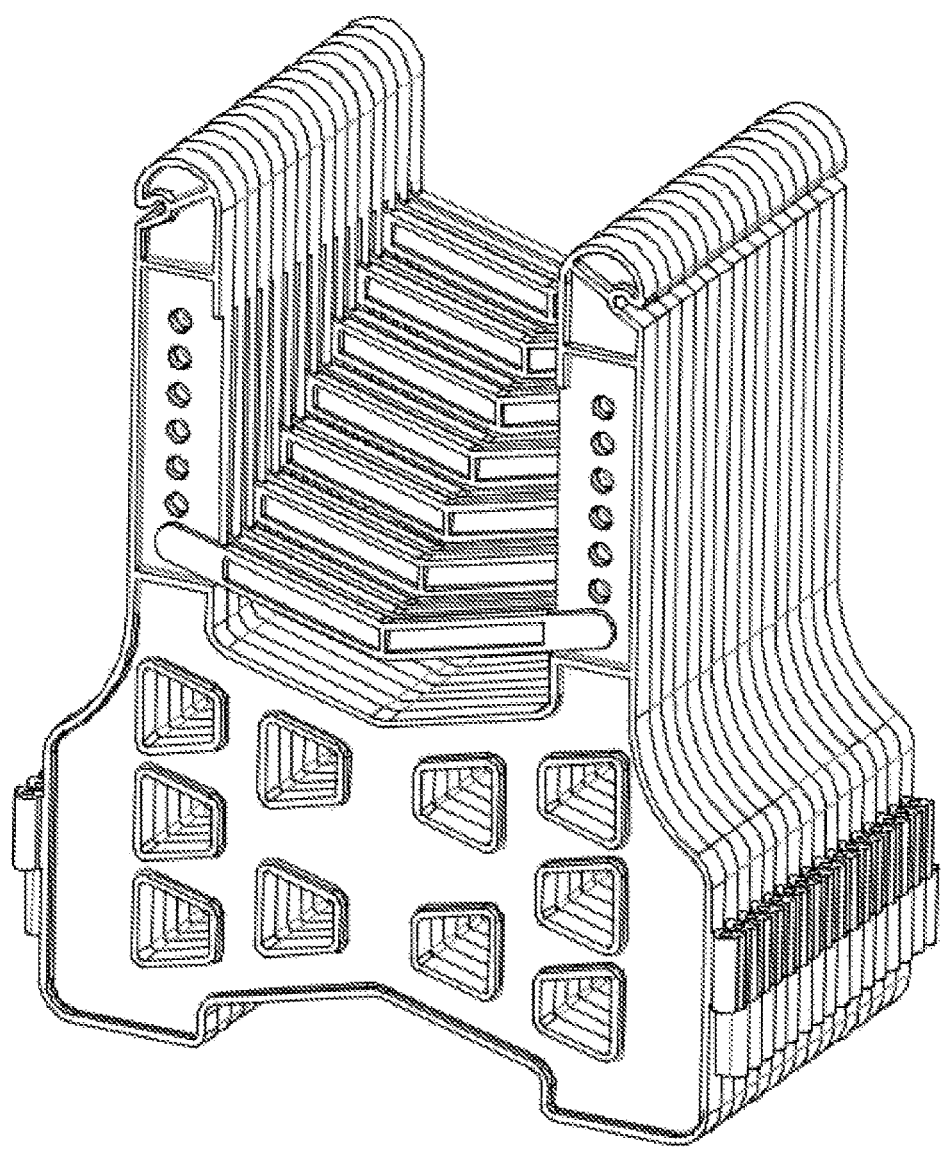
FIG. 1 is a first schematic diagram illustrating the structure of the RV sewer hose support with adjustable supporting height of the invention.
Figure 2:
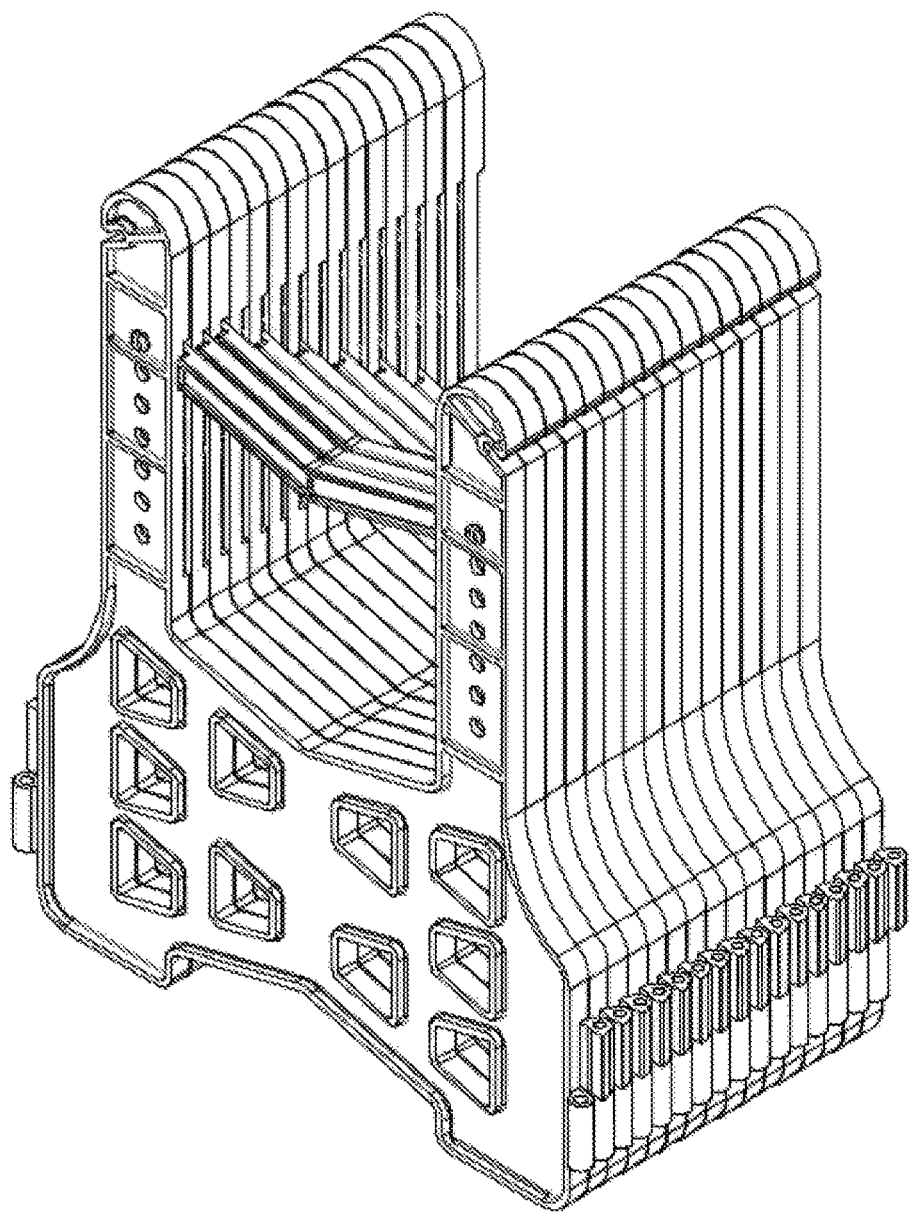
FIG. 2 is a second schematic diagram illustrating the structure of the RV sewer hose support with adjustable supporting height of the invention.
Figure 3:
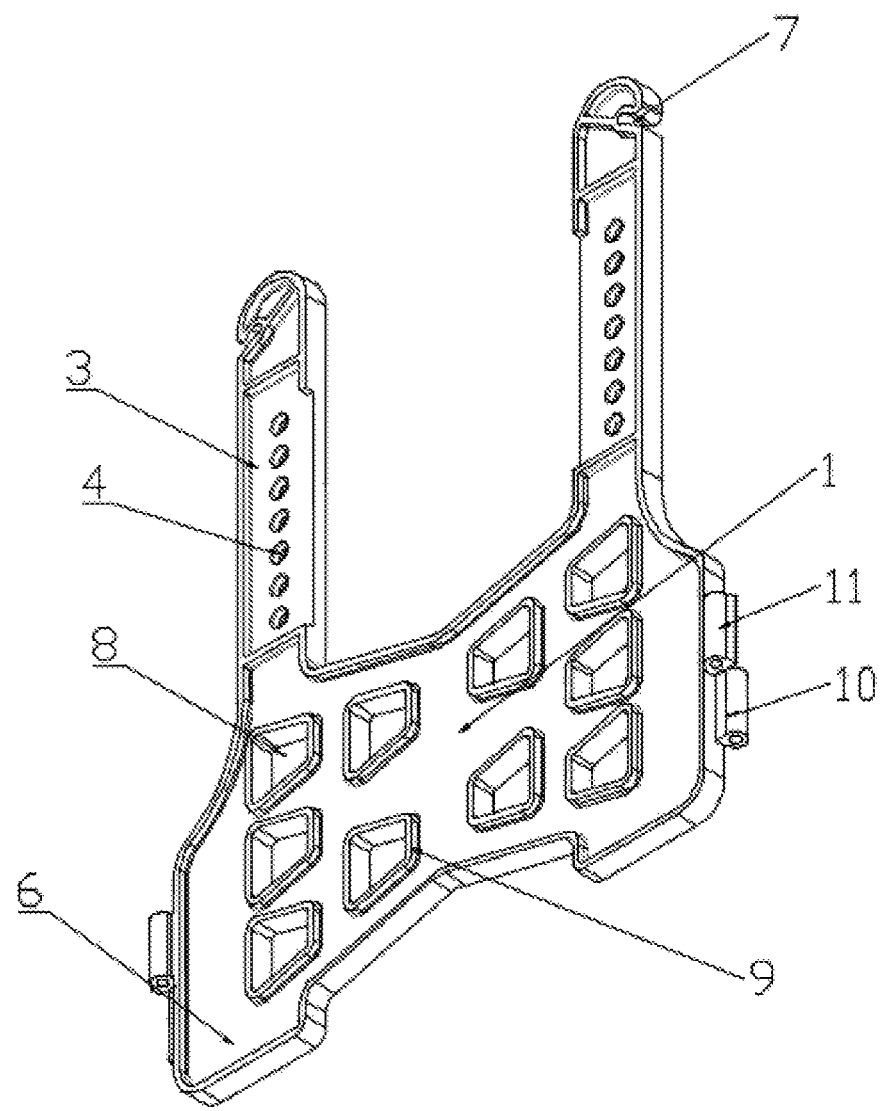
FIG. 3 is a first schematic diagram illustrating the structure of the supporting plate, the supporting vertical rod, and the supporting leg of the RV sewer hose support with adjustable supporting height of the invention.
Figure 4:
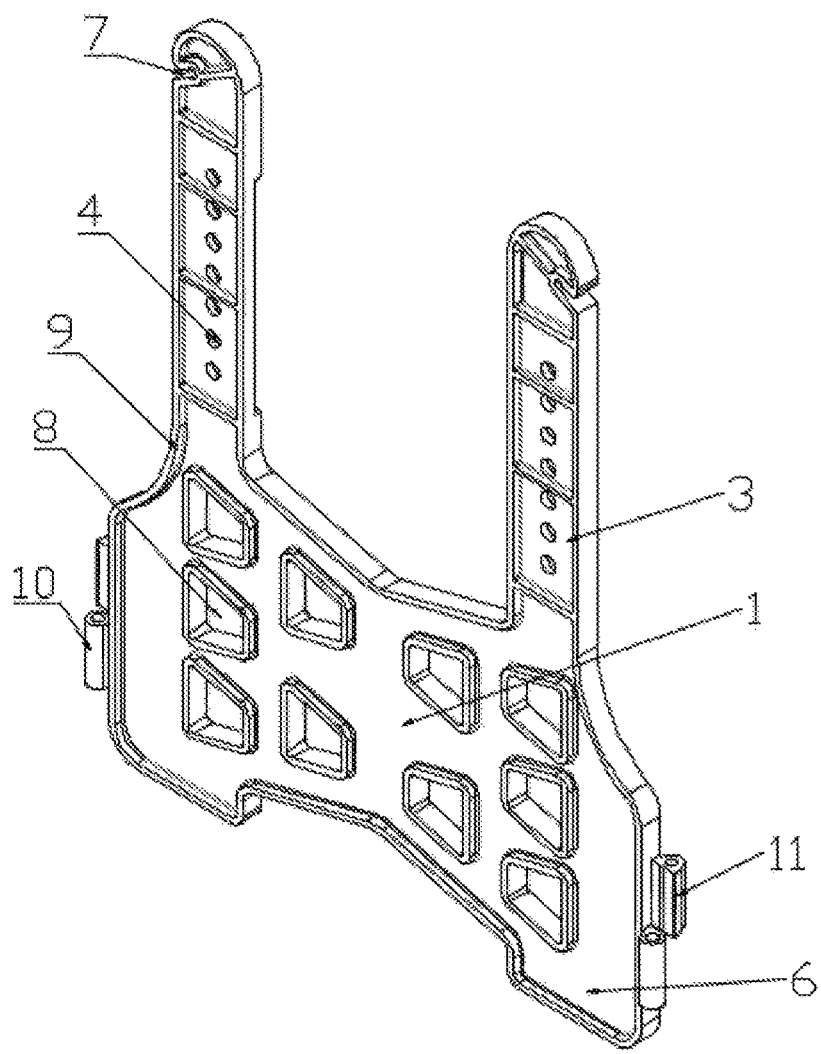
FIG. 4 is a second schematic diagram illustrating the structure of the supporting plate, the supporting vertical rod, and the supporting leg of the RV sewer hose support with adjustable supporting height of the invention
Figure 5:
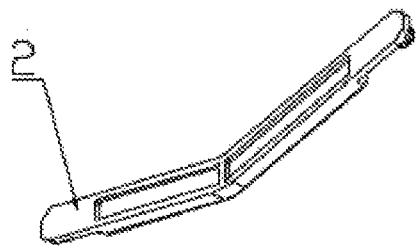
FIG. 5 is a first schematic diagram illustrating the structure of the supporting horizontal rod of the RV sewer hose support with adjustable supporting height of the invention.
Figure 6:
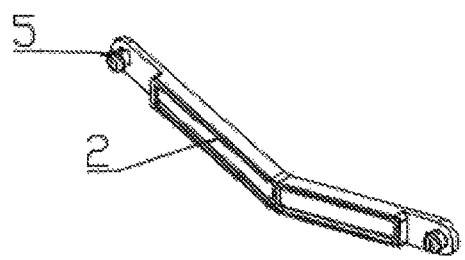
FIG. 6 is a second schematic diagram illustrating the structure of the supporting horizontal rod of the RV sewer hose support with adjustable supporting height of the invention.
Figure 7:
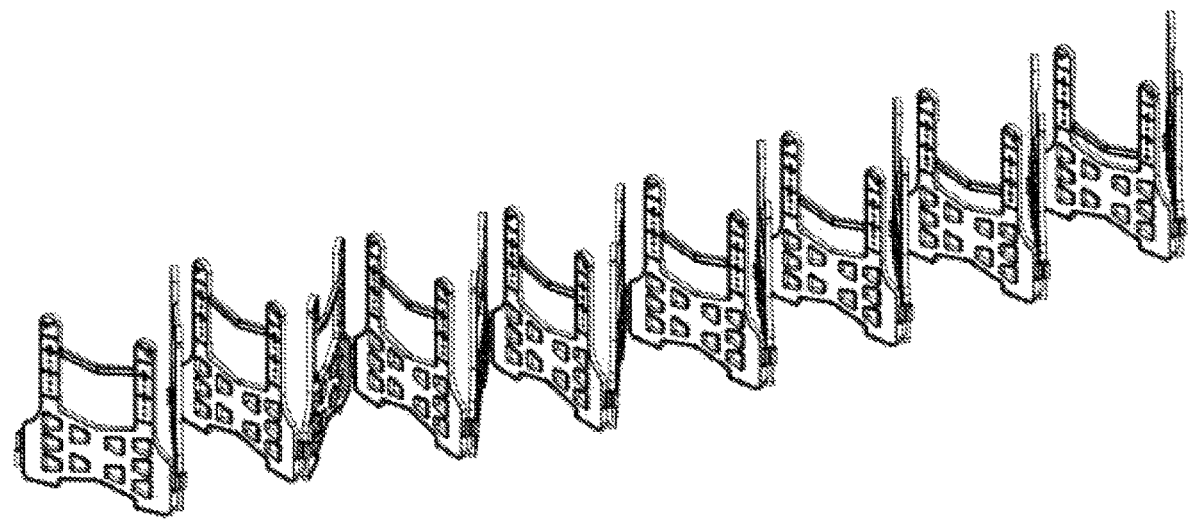
FIG. 7 is a schematic diagram illustrating the using state of the RV sewer hose support with adjustable supporting height of the invention.

With reference to FIG. 1-7, provided is a RV sewer hose support with adjustable supporting height, comprising a plurality of supporting components, wherein the adjacent supporting components are rotatably connected; the supporting component comprises a supporting plate 1 and a supporting horizontal rod 2; supporting vertical rods 3 are symmetrically arranged above the supporting plate 1 along the middle to both sides, and the supporting vertical rod 3 is provided with a plurality of connecting holes 4 along the extending direction; one side of the supporting horizontal rod 2 is symmetrically provided with a supporting post 5 that is matched with the connection holes 4 along the middle to both sides; the supporting plate 1 and the supporting vertical rod 3 are integrally formed, and the supporting plate 1 has a narrow upper and wide lower structure; the opposite outer side where the supporting vertical rod 3 meets the supporting plate 1 is in an arc shape, and the upper part of the supporting plate 1 located between two supporting vertical rods 3 is concave in a "V" shape; supporting legs 6 are symmetrically provided below the supporting plate 1 along the middle to both sides; the supporting leg 6 is integrally formed with the supporting plate 1, and the lower part of the supporting plate 1 located between two supporting legs 6 is concave in a "V" shape; a clamping groove 7 is provided on the opposite outer side of the supporting vertical rod 3 away from the supporting plate 1.

The supporting plate 1 is provided with perforations evenly 8; reinforcement ribs 9 are provided on the edge of the perforation 8, the edge of the supporting plate 1, the edge of the supporting leg 6, the edge and interior of the supporting vertical rod 3 and the edge of the supporting horizontal rod 2.

The supporting post 5 is provided with a slot in the middle to facilitate the clamping and disassembly of the supporting post 5 and the connecting holes 4.

The main body of the supporting horizontal rod 2 is a concave design, which can reduce the shrinkage deformation due to the thick workpiece while reducing the weight of the supporting horizontal rod 2.

The supporting plate 1 is provided with a first connecting base 10 and a second connecting base 11 at both ends, and both the first connecting base 10 and the second connecting base 11 are provided with shaft holes; rotary connection is achieved between adjacent supporting plates 1 through the first connecting base 10 on one supporting plate 1, the second connecting base 11 on the other supporting plate 1, and a pin shaft.

In specific implementation of the invention, the RV sewer hose support is extended, the angle between adjacent supporting components, and the connection position of the supporting horizontal rod 2 and the supporting vertical rod 3 on each supporting component are adjusted as required. The sewer hose is placed on the supporting horizontal rod 2 between the two supporting vertical rods 3, and the sewer hose and the supporting component are further fixed by the rubber band, so that the sewer hose is smoother and the sewage is discharged more smoothly. When it is not used, the supporting components can be folded together and bundled with rubber bands.

The invention adopts a method of adjusting the supporting position, and can use only two sets of molds to realize the production of the main parts of the entire set of products, which not only saves the production and R&D costs, but also facilitates the user to adjust the supporting height of the sewer hose support according to the actual situation; it avoids wasting molds and raw materials due to the need for the design of main bodies of different heights in actual use, and has a stable support, beautiful appearance and long service life.

The invention and the embodiments thereof have been described above, and the description is not restrictive; what is shown in the drawings is only one of the embodiments of the invention, and the actual structure is not limited thereto. In general, any structural manner and embodiment similar to the technical solution of the invention made by those of ordinary skill in the art without departing from the principle of the invention and without creative efforts shall all fall within the protection scope of the invention.

The invention claimed is:

1. A RV sewer hose support with adjustable supporting height, comprising a plurality of supporting components, wherein adjacent supporting components are rotatably connected;

each supporting component comprises a supporting plate (1) and a supporting horizontal rod (2); supporting vertical rods (3) are symmetrically arranged above the supporting plate (1) on opposing sides of the supporting plate (1), and the supporting vertical rods (3) are provided with a plurality of connecting holes (4) along an extending direction; opposing sides of the supporting horizontal rod (2) are provided with a supporting post (5) that are matched with the connection holes;

the supporting plate (1) and the supporting vertical rods (3) are integrally formed, and the supporting plate (1) has a narrow upper and wide lower structure; an opposite outer side where the supporting vertical rod (3) meets the supporting plate (1) is in an arc shape, and the upper narrow structure of the supporting plate (1) located between two supporting vertical rods (3) is concave in a "V" shape; supporting legs (6) are symmetrically provided on the opposing sides of the supporting plate (1); the supporting legs (6) are integrally formed with the supporting plate (1), and a lower part of the supporting plate (1) located between two supporting legs (6) is concave in a "V" shape;

a clamping groove (7) is provided on the opposite outer side of the supporting vertical rod (3) away from the supporting plate (1).

2. The RV sewer hose support with adjustable supporting height according to claim 1, wherein the supporting plate (1) is provided with perforations evenly (8); reinforcement ribs (9) are provided on an edge of the perforation (8), an edge of the supporting plate (1), an edge of the supporting leg (6), an edge and interior of the supporting vertical rod (3) and an edge of the supporting horizontal rod (2).

3. The RV sewer hose support with adjustable supporting height according to claim 1, wherein the supporting post (5) is provided with a slot in the middle to facilitate the clamping and disassembly of the supporting post (5) and the connecting holes (4).

4. The RV sewer hose support with adjustable supporting height according to claim 1, wherein a main body of the supporting horizontal rod (2) is a concave design, which can reduce shrinkage deformation due to a thick workpiece while reducing the weight of the supporting horizontal rod (2).

5. The RV sewer hose support with adjustable supporting height according to claim 1, wherein the supporting plate (1) is provided with a first connecting base (10) and a second connecting base (11) at both ends, and both the first connecting base (10) and the second connecting base (11) are provided with shaft holes; rotary connection is achieved between adjacent supporting plates (1) through the first connecting base (10) on one supporting plate (1), the second connecting base (11) on the other supporting plate (1), and a pin shaft.

\* \* \* \* \*